United States Patent [19]
Rach et al.

[11] Patent Number: 5,965,460
[45] Date of Patent: *Oct. 12, 1999

[54] POLYURETHANE COMPOSITION WITH (METH)ACRYLATE END GROUPS USEFUL IN THE MANUFACTURE OF POLISHING PADS

[75] Inventors: Joseph Rach, Newark; Douglas Leach, Hockessin, both of Del.

[73] Assignee: Mac Dermid, Incorporated, Waterbury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,446

[22] Filed: Jan. 29, 1997

[51] Int. Cl.$^6$ ........................................................ B24B 1/00
[52] U.S. Cl. .......................... 438/692; 216/89; 522/96; 451/526; 451/41
[58] Field of Search .................... 430/18, 284.1, 430/287.1, 288.1; 522/96, 93, 97, 98; 216/89; 438/692, 959; 451/526–539, 41

[56] References Cited

U.S. PATENT DOCUMENTS

| | | | |
|---|---|---|---|
| 3,960,572 | 6/1976 | Ibata et al. | 430/783.1 |
| 4,082,634 | 4/1978 | Chang | 522/96 |
| 4,131,602 | 12/1978 | Hodakowski et al. | 522/96 X |
| 4,133,723 | 1/1979 | Howard | 522/96 X |
| 4,137,081 | 1/1979 | Pohl | 430/271.1 |
| 4,138,299 | 2/1979 | Bolgiano | 522/96 |
| 4,188,455 | 2/1980 | Howard | 522/96 X |
| 4,192,684 | 3/1980 | Gensho et al. | 522/96 X |
| 4,213,837 | 7/1980 | Bristowe et al. | 522/96 X |
| 4,254,230 | 3/1981 | Howard | 522/96 X |
| 4,442,302 | 4/1984 | Pohl | 204/159.23 |
| 4,472,019 | 9/1984 | Bishop et al. | 522/96 X |
| 4,780,487 | 10/1988 | Kurpiewski et al. | 522/96 X |
| 4,857,434 | 8/1989 | Klinger | 430/286.1 |
| 5,093,386 | 3/1992 | Bishop et al. | 522/96 |
| 5,102,774 | 4/1992 | Setthachayanon | 430/284.1 |
| 5,135,964 | 8/1992 | Lee et al. | 522/96 |
| 5,185,234 | 2/1993 | Nakatsukasa et al. | 522/96 X |
| 5,216,843 | 6/1993 | Breivogel et al. | 451/285 |
| 5,328,805 | 7/1994 | Huynh-Tran et al. | 522/96 X |
| 5,336,585 | 8/1994 | Takahashi et al. | 430/18 X |
| 5,416,880 | 5/1995 | Edwards et al. | 522/96 X |
| 5,489,233 | 2/1996 | Cook et al. | 451/41 |
| 5,496,870 | 3/1996 | Chawla et al. | 522/96 X |
| 5,554,712 | 9/1996 | Huynh-Tran et al. | 522/96 X |
| 5,616,630 | 4/1997 | Heinze | 522/96 |
| 5,629,804 | 5/1997 | Tomono | 522/96 X |
| 5,716,757 | 2/1998 | Sakata et al. | 430/284.1 |
| 5,759,090 | 6/1998 | Kawate et al. | 451/56 |

FOREIGN PATENT DOCUMENTS

| | | | |
|---|---|---|---|
| 0 210 339 | 2/1987 | European Pat. Off. | C08G 18/10 |
| WO 92/06846 | 4/1992 | WIPO | B32B 17/04 |

*Primary Examiner*—Bernard Codd
*Attorney, Agent, or Firm*—John L. Cordani

[57] ABSTRACT

Particular polyurethane photopolymers are disclosed as materials of construction in producing improved polishing pads. The polyurethane photopolymers are formed from a polyurethane prepolymer prepared from the reaction products of a first reactant selected from the group consisting of polyesters, polyethers, polybutadienes and mixtures of the foregoing with diisocyanates, further reacted with acrylates and/or methacrylates.

16 Claims, No Drawings

POLYURETHANE COMPOSITION WITH (METH)ACRYLATE END GROUPS USEFUL IN THE MANUFACTURE OF POLISHING PADS

BACKGROUND OF THE INVENTION

This invention relates to compositions useful in the manufacture of polishing pads which can be used for creating smooth, ultra-flat surfaces on items such as glass, semiconductors, dielectric/metal composites, metals, and integrated circuits. The instant invention proposes the manufacture of polishing pads from specifically advantageous photopolymer compositions.

Polishing generally consists of the controlled wear of an initially rough surface to produce a smooth (specular) surface. One method of accomplishing this is by rubbing a pad against the surface of the article to be polished (the work-piece) in a repetitive regular motion. Frequently, a slurry or suspension of fine particles is present at the interface between the polishing pad and the work-piece.

Polishing pads have historically been fabricated from felted or woven natural fibers such as wool, urethane impregnated felted polyester on various types of filled polyurethane plastic. U.S. Pat. No. 5,489,233, the teaching of which are incorporated herein by reference in their entirety, discloses some polymers useful in the manufacture of polishing pads and desired characteristics of these pads.

The polishing rate regarding a polishing pad is controlled by a variety of variables including pressure between the pad and work-piece, velocity of the pad in relation to the work-piece, size of the particles in the slurry, hardness of the particles in the slurry and of the pad material, configuration of the pad surface, texture of the pad material, and possibly chemical reactivity between the slurry or the pad and the work-piece.

Generally macrotexture and microtexture of the pad are provided for in the pad manufacturing process. U.S. Pat. Nos. 5,081,051 and 5,216,843, the teaching both of which are incorporated herein by reference in their entirety, disclose the importance of maintaining this macrotexture. Frequently polishing pads have depended upon inhomogenity in the pad material to achieve polishing. However in order to achieve acceptable polishing the inhomogenity must be constant across the surface (throughout the body) of the pad. Many of the materials used to make pads however fall short in this regard. Thus, for example, variability in density of felt for pads or variations in filler density negatively impact polishing performance.

The inventors herein propose the use of photopolymers to create polishing pads with the appropriate texture and surface features for optimum polishing characteristics. These photopolymers provide pads with the appropriate surface texture without any substantial inhomogenity in the bulk material. The pads produced have optimum polishing characteristics and are relatively economical.

SUMMARY OF THE INVENTION

An improved polishing pad is described. The polishing pad comprises a photopolymer comprising:

a). a first polyurethane prepolymer which is the reaction product of a first reactant selected from the group consisting of polyester diols, polyether diols, hydroxy terminated polybutadienes, and mixtures of the foregoing, and a diisocyanate, subsequently further reacted with a hydroxy (meth)acrylate or a hydroxy acrylate to achieve end capping;

b). optionally, a second polyurethane prepolymer which is the reaction product of a mixture of two or more polyether diols, a dihydroxy carboxylic acid and a diisocyanate, and subsequently further reacted with a hydroxy acrylate or a hydroxy methacrylate to achieve end capping;

c). at least one ethylenically unsaturated monomer; and d). at least one photoinitiator.

wherein said photopolymer has been cured by exposure to actinic light. Preferably said photopolymer has been cured in an imagewise fashion in order to create the surface features of the polishing pad.

The inventors have found that polishing pads comprising a photopolymer which comprises the foregoing ingredients provides polishing pads with optimum polishing characteristics, including surface texture. In addition the foregoing compositions easily and economically produce polishing pads with any desired surface features through photoimageability of the composition.

DETAILED DESCRIPTION OF THE INVENTION

The liquid photopolymer compositions disclosed herein are useful in producing polishing pads with optimum polishing characteristics. The polishing pads proposed herein comprise a photopolymer comprising:

a). a first polyurethane prepolymer comprising the reaction product of a first reactant selected from the group consisting of polyester diols, polyether diols, hydroxy terminated polybutadienes, and mixtures of the foregoing, and a diisocyanate, the foregoing blend being subsequently further reacted with a hydroxy-acrylate and/or a hydroxy-methacrylate to achieve end capping;

b). optionally, a second polyurethane prepolymer comprising the reaction product of a mixture of two or more polyether diols, a dihydroxy carboxylic acid and a diisocyanate, the foregoing mixture being subsequently further reacted with a hydroxy acrylate or a hydroxy methacrylate;

c). at least one ethylenically unsaturated monomer; and d). at least one photoinitiator.

wherein said photopolymer has been cured by exposure to actinic radiation.

As indicated the first polyurethane prepolymer is produced by reacting a first reactant selected from the group consisting of a polyester diols, polyether diols, hydroxy terminated polybutadienes, and mixtures of the foregoing, with a diisocyanate. The product of the foregoing reaction is then further reacted with a hydroxy acrylate and/or a hydroxy methacrylate in order to produce the first polyurethane prepolymer which may be represented by the following:

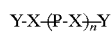

wherein each P of each P-X unit is independently selected from the group consisting of polyesters, polyethers and polybutadienes, X is selected from the group consisting of aromatic diisocyanates and aliphatic diisocyanates, Y is a terminal group selected from the group consisting of acrylates and methacrylates and n is an integer of from 2 to 20.

The second polyurethane prepolymer is produced by reacting a blend of two or more polyether diols, a dihydroxy carboxylic acid and a diisocyanate. The product of the foregoing reaction is then further reacted with a hydroxy acrylate and/or a hydroxy methacrylate in order to produce the second polyurethane prepolymer which may be represented by the following:

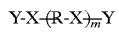

wherein each R of each R-X unit is independently selected from the group consisting of polyethers and carboxylic acids, X is selected from the group consisting of aromatic diisocyanates and aliphatic diisocyanates, Y is a terminal group selected from the group consisting of acrylates and methacrylates and m is an integer of from 2 to 20. (Note that as used herein and in the claims each P and/or R in the above indicated structures contains the terminal oxygens remaining from the hydroxy termination) Polyesters useful in the production of the first polyurethane prepolymers include polypropylene adipate, polyneopentylglycol adipate, and poly-2-methyl-1, propylene adipate.

Hydroxy terminated polybutadienes (dihydroxy polybutadienes or polybutadiene diols) useful in the production of the first polyurethane preoplymer include hydroxyl-terminated hydrogenated polybutadiene available from the Shell Chemical Company.

Polyethers useful in the production of the polyurethane prepolymers include polypropylene oxide and ethylene oxide propylene oxide copolymers.

The diisocyanate used for the production of the polyurethane prepolymers can be aromatic or aliphatic, but aromatic diisocyanates are preferred. Suitable aliphatic diisocyanates include trimethyl hexamethylene diisocyanate and biscyclohexyl methylene diisocyanate. Preferred aromatic diisocyanates include toluene diisocyanate and methylene diphenyl diisocyanate.

A variety of hydroxy acrylates and hydroxy methacrylates are suitable for producing the foregoing polyurethane prepolymers. Suitable hydroxy acrylates include acrylated caprolactone oligomers. Suitable hydroxy methacrylates include hydroxypropyl methacrylate and polypropylene glycol monomethacrylate. Polypropylene glycol monomethacrylate, hydroxy propyl methacrylate or a mixture of the foregoing are preferred.

The dihydroxy carboxylic acids useful in the production of the second polyurethane prepolymer include bis-hydroxymethyl propionic acid, dihydroxy phenylacetic acid, and dihydroxybenzene di-acetic acid.

The polyurethane prepolymers of the current invention are prepared by reacting an excess of a diisocyanate with the diol or diols noted. In the case of the first polyurethane prepolymer the diols will be polyester diol(s), polyether diol(s) polybutadiene diol(s) or mixtures thereof. In the case of the second polyurethane prepolymer the diols will be a mixture of polyether diol(s) and dihydroxy carboxylic acid (s). The foregoing reaction of the diisocyanate and the noted diols will form an isocyanate terminated polyurethane oligomer. Other ingredients such as ethylenically unsaturated monomers, acetic acid or solvents may be added to the reactant mixture to adjust the viscosity thereof. The oligomer is then further reacted with hydroxy acrylates, hydroxy methacrylates or mixtures thereof to form the polyurethane prepolymers.

In order to produce a polyurethane prepolymer having the appropriate viscosity for manufacturing of polishing pads, and to produce polishing pads having the appropriate hardness, tensile strength and texture, it is preferred to begin with diols having a molecular weight from 500 to 5,000, more preferably between 1,000 and 4,000 and most preferably between 2,000 and 3,000.

In addition to the ethylenically unsaturated polyurethane prepolymer, the photopolymer resins of the current invention also comprise at least one ethylenically unsaturated monomer and at least one photoinitiator. The ethylenically unsaturated monomer may be any commonly available acrylate or methacrylate such as isobornylester, t-butylester, laurylester, monoesters or diesters of acrylic acid or methacrylic acid, and/or ethylene glycol or diethylene glycol diesters of methacrylic or acrylic acid, and/or triesters of trimethylopropanol or propoxylated trimethylolpropanol or glycerol. However, the use of a monomer having two or more ethylenically unsaturated groups in the monomer increases the hardness of the resultant polishing pad. Thus the amount of monomers with two or more ethylenically unsaturated groups in the monomer increases the hardness of the resultant polishing pad. Therefore the amount of monomers with two or more ethylenically unsaturated groups should be controlled such that a polishing pad with the desired hardness is the result.

It is preferred that the ethylenically unsaturated monomer comprise a mixture of monomers with some having one ethylenically unsaturated group and some having two or more ethylenically unsaturated groups. The optimum ratio of the mixture will be determined by the desired hardness of the resulting polishing pad. The amount of the monomer or monomer mixture will have an effect on the viscosity of the photosensitive resin. The greater the amount of the monomer or monomer mixture, the lower the resultant viscosity of the photosensitive resin. The viscosity of the photosensitive resin is preferably between 10,000 cps and 200,000 cps at room temperature and more preferably between 20,000 cps and 50,000 cps.

Any commonly used photopolymerization initiator customarily used in similar photosensitive resin compositions will be suitable. Specifically, ethers, such as benzoin ethers, or acetophenone and its derivatives, or alpha-hydroxy ketones, are commonly used as photopolymerization initiators. Particularly preferred initiators include 2,2-dimethoxy-2-phenylacetophenone, 2,2-diethoxyacetophenone or 1-hydroxycyclohexyl phenyl ketone. Optionally, an aromatic ketone, such as benzophenone can be added in addition to the aforementioned photoinitiator. The amount of the initiator can be any effective concentration which will allow the formulation of a base layer to the polishing pad via a back exposure of a reasonable length of time, and the formation of a relief image with the required resolution. The effective amount of photopolymerization initiator will depend upon the initiator chosen and the desired thickness of the resultant pad. For 2,2-dimethoxy-2-phenylacetophenone, an effective concentration is between 0.5% by weight and 2% by weight, most preferably between 0.5% and 1.0% by weight. For 2,2-diethoxyacetophenone or 1-hydroxylcyclohexylphenyl ketone, an effective concentration is from about 0.75% to about 2.0% by weight. An effective concentration of an added aromatic ketone is from 0.1% to 0.5% by weight.

The foregoing photopolymer resin is then used to fabricate the polishing pads of the instant invention. In this regard a thin flexible cover sheet, usually polypropylene, is applied over the top of the photographic negative which contains an image of the pattern to be in the polishing pad, on the lower glass of the exposure unit. Photopolymer resin is cast to an appropriate thickness onto this cover film. A polyethylene terphthalate substrate is laminated to the top of the photopolymer resin. The foregoing substrate is preferably from 4 to 7 mils in thickness. The substrate should be substantially transparent to actinic radiation. At this point the photopolymer resin is exposed to actinic radiation. Actinic radiation is shown through the substrate at such an intensity for such a time as to cause the photopolymer resin to polymerize from the substrate up to a level which is 60 to 80 percent of the way to the surface of the photopolymer resin. Actinic radiation is also shown through the artwork (image) and the cover sheet at an intensity and for such a time as to selectively polymerize the surface of the photopolymer to a depth of 20 to 40 percent of the total photopolymer depth. The selective polymerization on the surface of the photopolymer creates the desired surface features on the surface of the polishing pad.

After the foregoing procedures are complete, the artwork is removed and the coversheet is peeled away. The unpolymerized photopolymer resin is then washed away yielding the resultant polishing pad with the desired surface features as are defined by the artwork and subsequent selective polymerization of the photopolymer resin.

For a discussion of the advantages and disadvantages of any particular type of surface features and macro and micro textures, reference is made to U.S. Pat. No. 5,489,233 (Cook et.al.), the teaching of which are incorporated herein by reference in their entirety. However, in any case, photopolymer printing plates using the photopolymer resins of this invention can easily be produced with any surface features or textures desired, through photolithography.

This invention is further described by way of the following examples which are illustrative rather than limiting.

EXAMPLE I

To a mixture of 40.7 parts by weight polypropylene adipate polyester diol (MW 2400; S108, Ruco Corp.) and 32.9 parts by weight ethylene oxide/propylene oxide copolymer (MW 2000; Poly G 55-53, Olin Corp.) is added 130 ppm dibutyltin dilaurate catalyst and 8.5 parts of toluene diisocyanate (Mondur TD 80, Bayer). The resulting mixture was reacted at 70° C. for 2.5 hours to obtain a polyurethane oligomer having isocyanate groups at both ends of the molecule. To this was added 17.75 parts by weight of hydroxypropyl methacrylate, 0.1 parts t-butyl hydroxytoluene and 100 ppm dibutyltin dilaurate after which the reaction was stirred at 70° C., until no residual isocyanate could be determined by titration with di-n-butylamine, thereby forming the desired polyurethane preoplymer. To 80.5 grams of the foregoing polyurethane prepolymer were added 5.0 grams of trimethylolpropane trimethacrylate, 0.75 grams of 2,2 dimethyloxy-2-phenylacetylphenone, 13.0 grams of ethylene glycol dimethacrylate (EGDMA), 0.50 grams of benzophenone, 0.07 grams of triethanolamine and 0.2 grams of t-butyl hydroxy toluene. The resulting mixture was stirred for 2 hours to obtain the photopolymer resin.

A 1 mil thick polypropylene cover sheet was applied over the artwork on a lower piece of glass. The artwork had a concentric circular design which was alternately transparent and opaque to actinic radiation. The photopolymer resin was then cast upon the cover sheet to a thickness of 50 mils. A 4 mil thick polyethylene terphthalate substrate was laminated over the photopolymer resin. The photopolymer resin was then irradiated with 2 MW/cm$^2$ of actinic radiation of 300 nm wavelength for 0.5 minutes through the artwork and coverfilm. The artwork and coverfilm were then removed and the undeveloped photopolymer resin was washed away using an aqueous surfactant solution. The procedure yielded a 0.050 inch thick polishing pad with concentric circular ridges on the polishing surface.

EXAMPLE II

Example 1 was repeated except that a second polyurethane prepolymer was substituted for the polyurethane prepolymer of Example 1. The second polyurethane prepolymer was prepared by mixing 29.1 parts by weight polyethylene oxide/polypropylene oxide copolymer (MW 2000; Poly G 55-53, Olin Corp.), 47.0 parts polypropylene oxide (MW 2000; Poly G 20-56, Olin Corp.); 1.95 parts bishydroxylmethylpropionic acid, 170 ppm dibutyltin dilaurate catalyst and 12.8 parts of toluene diisocyanate. The resulting mixture was reacted at 80° C. for 6 hours to obtain a polyurethane oligomer having isocyanate groups at both ends of the molecule. To this were added 9.0 parts by weight hydroxypropylmethacrylate and 170 ppm dibutyltin dilaurate and 0.1 parts t-butylhydroxy toluene after which the reaction mixture was stirred at 80° C., until no residual isocyanate could be determined by titration with di-n-butylamine, thereby forming the desired polyurethane prepolymer.

EXAMPLE III

To a mixture of 200 parts by weight of a hydroxy-terminated hydrogenated polybutadiene, 40 parts of isobornyl methacrylate, 0.5 parts of acetic acid and 0.6 parts of t-butyl hydroxy toluene (BHT) was added 14 parts by weight of toluene diisocyanate. The resulting mixture was reacted at 50° C. for 2.5 hours to obtain a polyurethane oligomer having isocyanate groups at both ends of the molecule. To this was added 12 parts by weight of hydroxypropyl methacrylate and dibutyltin dilaurate (DBTDL) (20 ppm) after which the reaction mixture was stirred at 70° C. until no residual isocyanate could be determined by titration with di-n-butyl amine.

To 83 grams of this prepolymer were added 10 grams of isobornyl methacrylate and 4.5 grams of trimethylolpropane trimethacrylate (TMPTMA), 1.0 grams 2,2-dimethoxy-2-phenylacetophenone, 0.5 grams of benzophenone and 0.1 grams BHT. The resulting mixture was stirred for 2 hours to obtain a photosensitive resin composition.

A 1 mil thick polypropylene cover sheet was applied over the artowrk on a lower piece of glass. The artwork had a concentric circular design which was alternately transparent and opaque to actinic radiation. The photopolymer resin was then cast upon the cover sheet to a thickness of 50 mils. A 4 mil thick polyethylene terphthalate substrate was laminated over the photopolymer resin. The photopolymer resin was then irradiated with 2 MW/cm$^2$ of actinic radiation of 300 nm wavelength for 0.5 minutes through the artwork and coverfilm. The artwork and coverfilm were then removed and the undeveloped photopolymer resin was washed away using an aqueous surfactant solution. The procedure yielded a 0.050 inch thick polishing pad with concentric circular ridges on the polishing surface.

We claim:

1. A method of polishing the surface of a silicon semi-conductor wafer which method comprises contacting the surface of the silicon semi-conductor wafer with a polishing pad, which polishing pad comprises a polyurethane photopolymer resin which photopolymer resin has been cured by exposure to actinic radiation and wherein said photopolymer resin, prior to said curing, comprises: (i) prepolymer; (ii) at least one ethylenically unsaturated monomer; and (iii) at least one photopolymerization initiator; and wherein said prepolymer is the reaction product of X, Y and P and which prepolymer has the following structure:

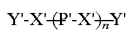

wherein P is selected from the group consisting of polyesters polybutadienes, polyethers and mixtures thereof, X is selected from the group consisting of aromatic diisocyanates, aliphatic diisocyanates, Y is selected from the group consisting of acrylates, methacrylates and mixtures thereof, wherein n is an integer of from 2 to 20, wherein P', X' and Y' are the reaction residues of P, X and Y respectively; wherein the polishing pad moves across the surface of the silicon semi-conductor wafer during said contact; wherein a slurry of fine particles is present at the interface between the polishing pad and the surface of the silicon semi-conductor wafer, and wherein the surface of the silicon semi-conductor wafer is polished as a result of the motion of the polishing pad across said surface.

2. A method according to claim 1 wherein the polyesters are selected from the group consisting of polypropylene adipate, polyneopentylglycol adipate, and poly-2-methyl-1,3 propylene adipate, and wherein the polyethers are selected from the group consisting of polypropylene oxide and ethylene oxide/propylene oxide copolymers.

3. A method according to claim 2 wherein the photoinitiator is selected from the group consisting of ethers, benzoin ethers, acetophenones, alpha-hydroxy ketones and aromatic ketones.

4. A method according to claim 1 wherein the ethylenically unsaturated monomer is selected from the group consisting of acrylates and methacrylates.

5. A method according to claim 1 wherein the photoinitiator is selected from the group consisting of ethers, benzoin ethers, acetophenones, alpha-hydroxy ketones, and aromatic ketones.

6. A method according to claim 1 wherein the photopolymer resin, prior to curing has a viscosity between 10,000 cps and 200,000 cps.

7. A method according to claim 1 wherein the ethylenically unsaturated monomer is selected from the group consisting of acrylates, methacrylates and mixtures thereof.

8. A method according to claim 1 wherein the photopolymer resin prior to said curing additionally comprises a second prepolymer which second prepolymer is the reaction product of X, Y and R and which prepolymer has the following structure:

$$Y'-X'-(P'-X')_{\overline{m}}Y'$$

wherein R is selected from the group consisting of polyethers, dihydroxy carboxylic acids and mixtures thereof, X is selected from the group consisting of aromatic diisocyanates, aliphatic diisocyanates, Y is selected from the group consisting of acrylates, methacrylates, and mixtures thereof, m is an integer of from 2 to 20 and X' Y' and R' are the reaction residues of X, Y and R respectively.

9. A method according to claim 8 wherein the polyesters are selected from the group consisting of polypropylene adipate, polyneopentylglycol adipate, and poly-2-methyl-1,3 propylene adipate, and wherein the polyethers are selected from the group consisting of polypropylene oxide and ethylene oxide/propylene oxide copolymers.

10. A method according to claim 9 wherein the dihydroxy carboxylic acids are selected from the group consisting of dihydroxy phenylacetic acid, dihydroxybenzene diacetic acid, and bis-hydroxymethyl propionic acid.

11. A method according to claim 10 wherein the ethylenically unsaturated monomer is selected from the group consisting of acrylates, methacrylates and mixtures thereof.

12. A method according to claim 11 wherein the photoinitiator is selected from the group consisting of ethers, benzoin ethers, acetophenones, alpha-hydroxy ketones and aromatic ketones.

13. A method according to claim 12 wherein the photopolymer resin prior to curing has a viscosity between 10,000 cps and 200,000 cps.

14. A method according to claim 8 wherein the ethylenically unsaturated monomer is selected from the group consisting of acrylates, methacrylates and mixtures thereof.

15. A method according to claim 8 wherein the photoinitiator is selected from the group consisting of ethers, benzoin ethers, acetophenones, alpha-hydroxy ketones, and aromatic ketones.

16. A method according to claim 8 wherein the dihydroxycarboxylic acids are selected from the group consisting of dihydroxy phenylacetic acid, dihydroxybenzene diacetic acid, and bis-hydroxymethyl propionic acid.

* * * * *